No. 762,740. PATENTED JUNE 14, 1904.
T. MIDGLEY.
PNEUMATIC TIRE.
APPLICATION FILED MAR. 23, 1904.
NO MODEL. 4 SHEETS—SHEET 1.

Witnesses
Inventor
Thomas Midgley.
By
Attorney

No. 762,740. PATENTED JUNE 14, 1904.
T. MIDGLEY.
PNEUMATIC TIRE.
APPLICATION FILED MAR. 23, 1904.
NO MODEL. 4 SHEETS—SHEET 2.

Witnesses
F. L. Ouraud.
W. Parker Reinohl.

Inventor
Thomas Midgley.
By D. G. Reinohl.
Attorney

No. 762,740. PATENTED JUNE 14, 1904.
T. MIDGLEY.
PNEUMATIC TIRE.
APPLICATION FILED MAR. 23, 1904.
NO MODEL. 4 SHEETS—SHEET 3.
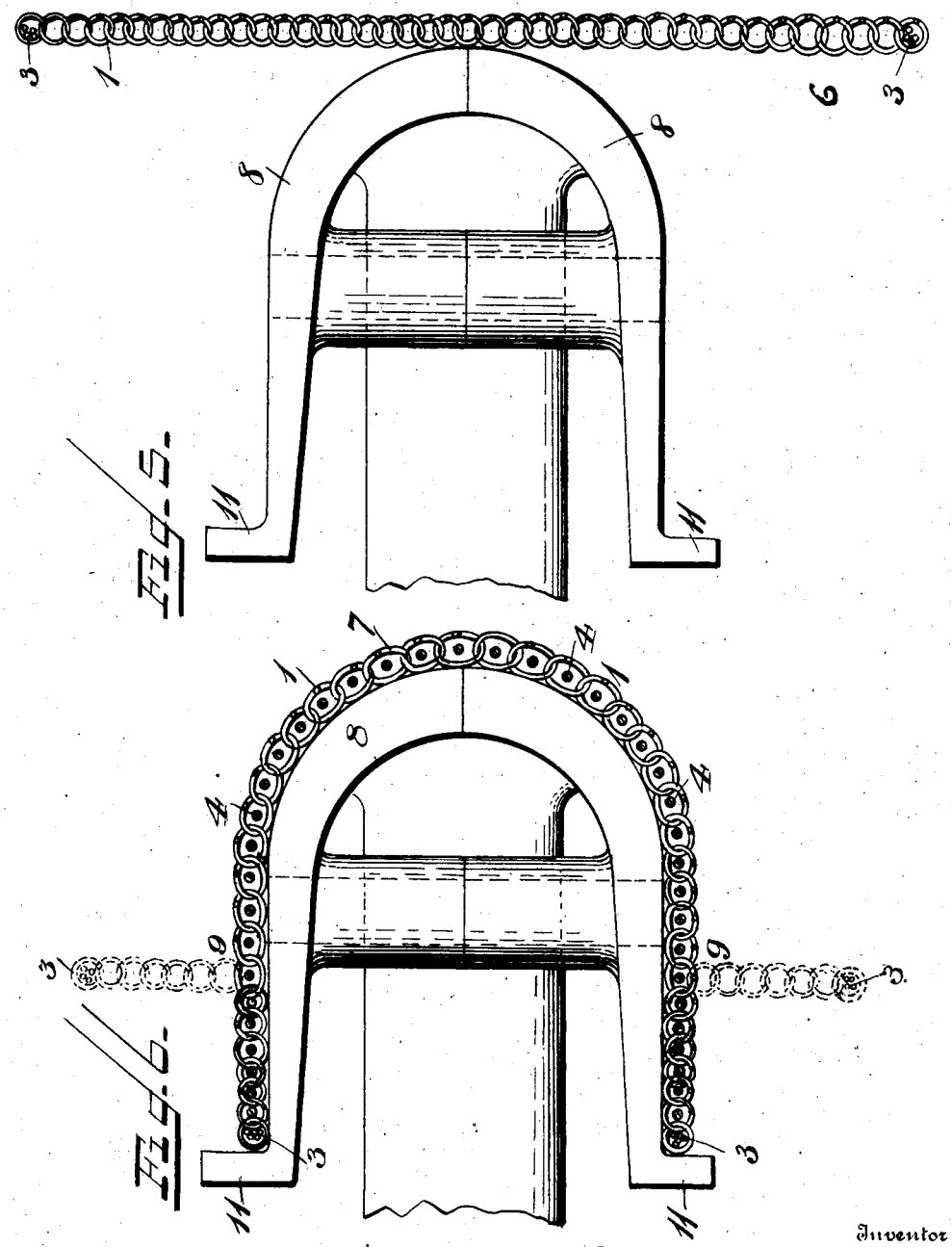

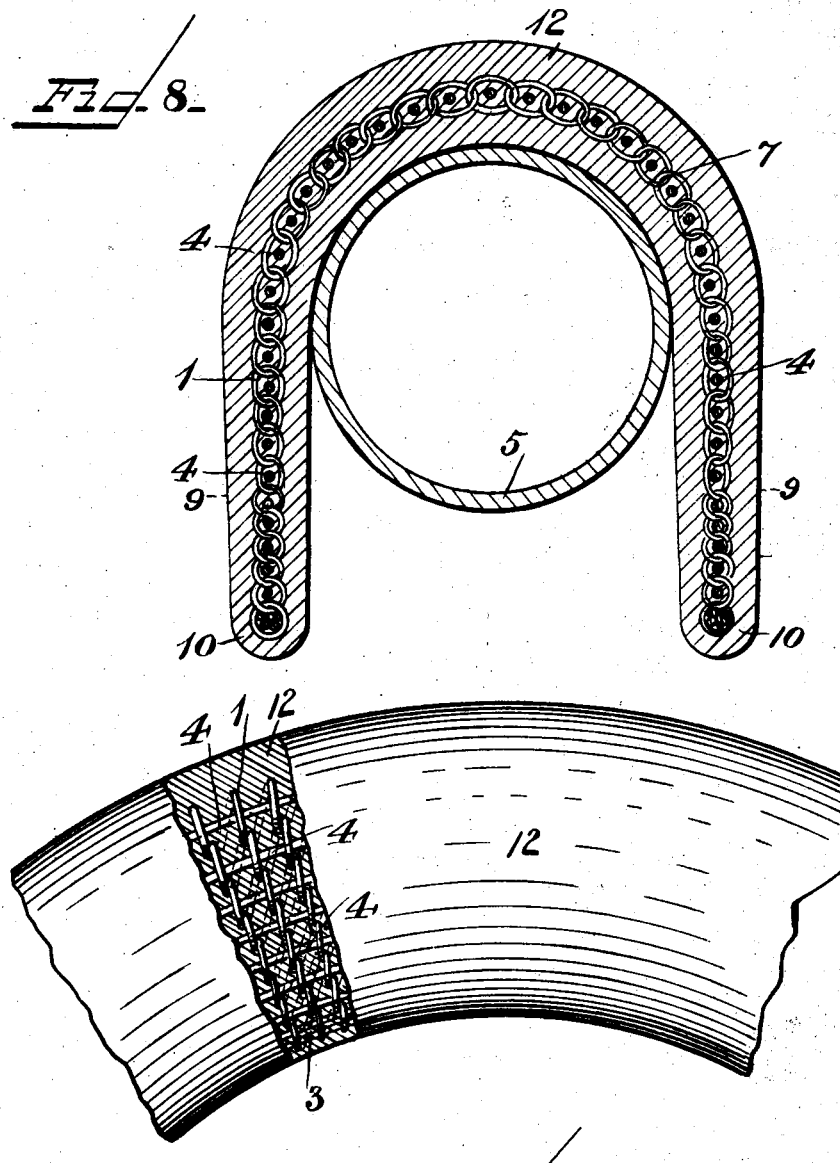

No. 762,740. Patented June 14, 1904.

UNITED STATES PATENT OFFICE.

THOMAS MIDGLEY, OF COLUMBUS, OHIO.

PNEUMATIC TIRE.

SPECIFICATION forming part of Letters Patent No. 762,740, dated June 14, 1904.

Application filed March 23, 1904. Serial No. 199,515. (No model.)

*To all whom it may concern:*

Be it known that I, THOMAS MIDGLEY, a citizen of the United States, residing at Columbus, in the county of Franklin and State of Ohio, have invented certain new and useful Improvements in Pneumatic Tires; and I do hereby declare the following to be a full, clear, and exact description of the invention, such as will enable others skilled in the art to which it appertains to make and use the same.

My invention relates to pneumatic tires for vehicles, such as automobiles and like constructions, and has for its object increased durability and reduction in the cost of maintenance of such tires; and the invention consists in certain improvements, which will be fully disclosed in the following specification and claims.

Practical experience in the use of pneumatic tires has demonstrated that the maximum destruction or wear and tear of the tire is not due to punctures or excessive wear upon the tread of the tire, but that in the class of tires which use a separate cover, such as the "Dunlop" or "Clincher" tires, or in the cylindrical tire the greatest deterioration is due to the constant changes in the material of which the tires are made by the flexure of the tire on its sides between the tread of the tire and its bearing on the rim of a wheel. In the covers or casings of the Dunlop and the Clincher type of tires this flexure is very pronounced and weakens the sides of the cover very rapidly, and this flexure causes the canvas to break in successive layers from the outside inward circumferentially under the tread of the tire. This deterioration of the canvas is also augmented by the friction of the body of air under high pressure within the tire as it is displaced by the revolution of the wheel, due to the high degree of heat generated in the tire by the moving body of air.

The purpose of my invention is to remedy these defects by providing a tire which is not affected by flexure or friction and is capable of sustaining any degree of pressure that may be applied to the air used to inflate the tire.

Figure 1:
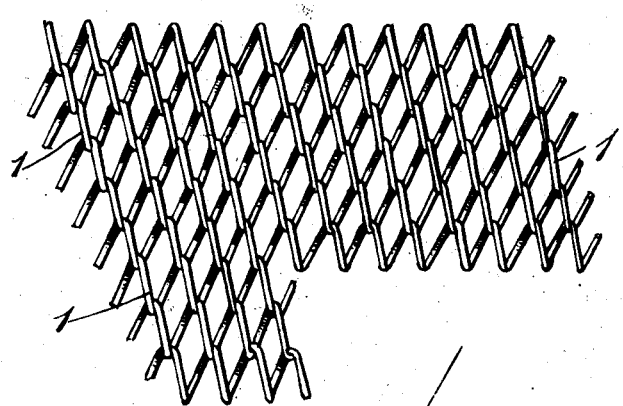
Figure 2:
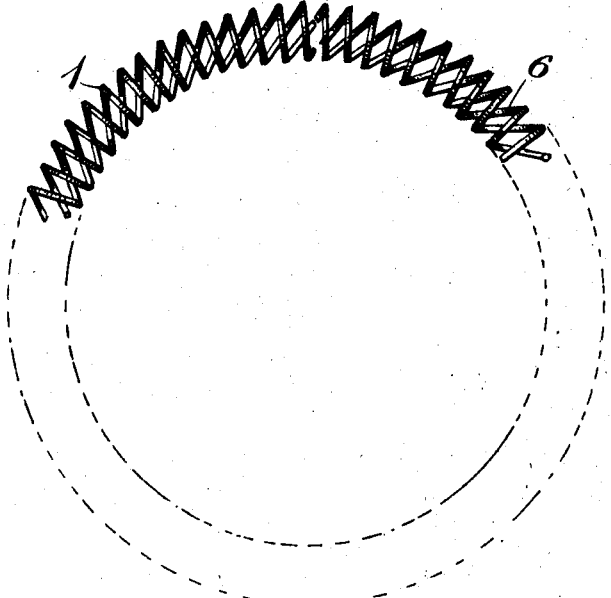
Figure 3:
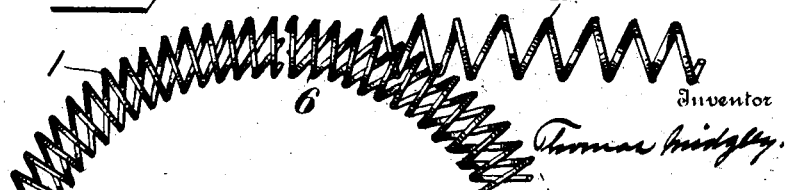
Figure 4:
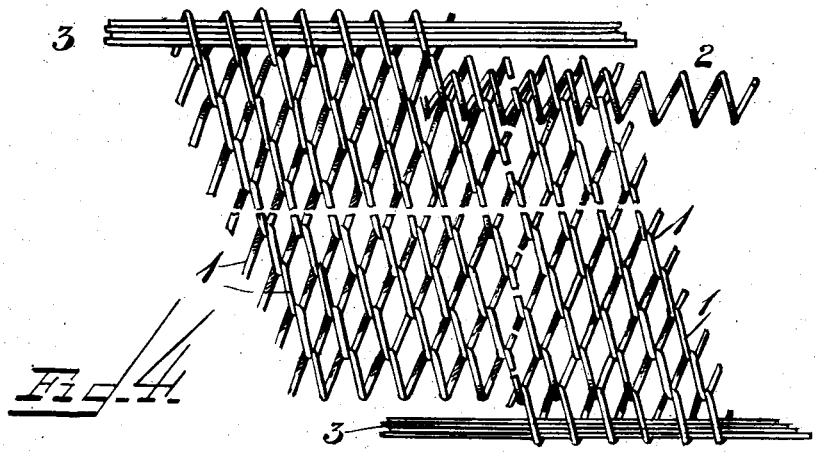
Figure 7:
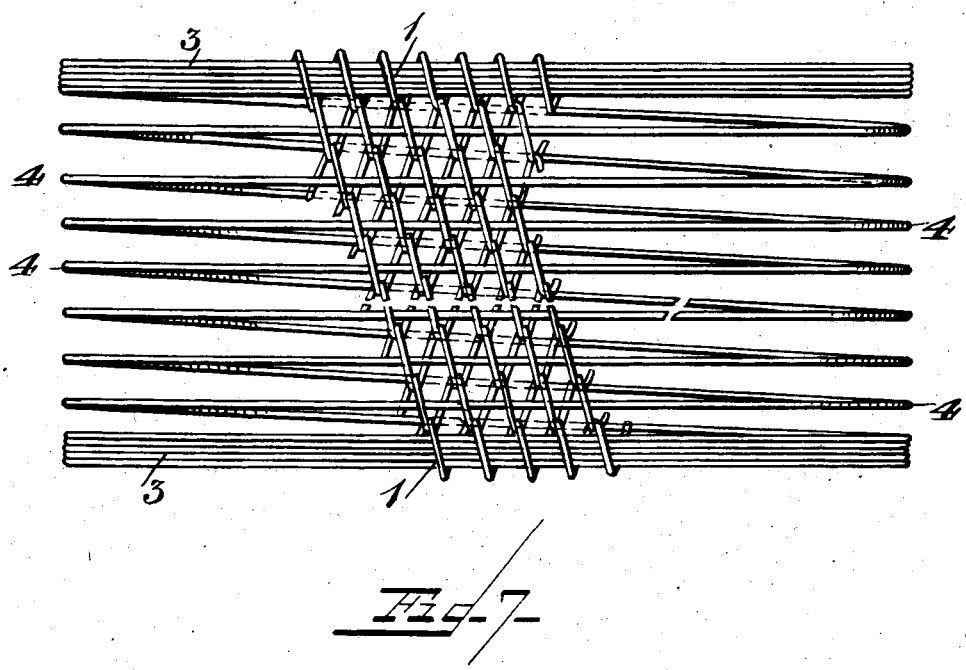

In the accompanying drawings, which form part of this specification, Figure 1 represents a plan of a section of woven-wire fabric to form the tire-body, the helices being shown on an enlarged scale; Fig. 2, a side elevation of the same bent into an annulus with the ends of the fabric abutting; Fig. 3, a like view showing a means for connecting the ends of the fabric; Fig. 4, a top plan view showing the multiple rods in the helices on the edges of the fabric; Fig. 5, a transverse section of a segment of the former and the tire-body in position around it, the helices being shown on a reduced scale; Fig. 6, a like view showing the tire-body partly distended; Fig. 7, a top plan view of a section of the tire-body, showing the helices and the longitudinal reinforces on an enlarged scale; Fig. 8, a transverse section of the tire, full size, in one of its forms inclosing a tube; and Fig. 9, a side elevation of a section of a tire with the rubber partly broke away to expose the tire-body.

Reference being had to the drawings and the designating characters thereon, 1 indicates wire helices which are woven together by screwing one helix or section into another as they proceed from the coiling-machine until a piece of fabric is formed of a length equal to the circumference of the tire-body required and of a width equal to the transverse area of the tire.

2 indicates short sections of helices used in this instance to connect the abutting ends of the fabric after it has been bent into an annulus to form a tire-body and are screwed into the helices 1 a sufficient distance on each side of the ends of the helices 1 to connect them securely. I have shown this way of connecting the adjacent ends of the helices for the purpose of illustration, but do not confine or limit myself thereto, as they may be connected by other means. The outer helix or section on each edge of the tire-body is provided with a plurality of wires 3, which form rings by soldering their adjacent ends to stiffen the edges of the tire where it engages the rim of a wheel, and all the helices are provided with a longitudinal reinforce 4, which is screwed into the tire-body from one edge throughout the body in concentric helices or convolutions from the edges to the transverse center of the tire-body or tread of the tire. This longitudinal reinforce prevents elongation of the helices under the pressure exerted in the tube 5 of the tire, and consequent bulging or forming humps on the tire, and forms an additional means for connecting the helices together transversely of the tire-body by being screwed into them successively.

In forming the annulus 6 the adjacent ends of the sheet of fabric are preferably brought together, so that the helices on the edges are out of register or one extending beyond the other, as shown in Fig. 4, to facilitate the insertion of the wire rings 3 and the reinforces 4.

In the manufacture of the tire-body (designated 7) the annulus 6 is provided with the rings 3 on each edge and is placed around an annular former composed of a plurality of segments 8, only one of which is shown, and of the transverse contour of the tire to be made. The annular former is provided with means (not shown) for expanding the segments and therewith expanding or distending the annulus 6 into a tire-body the contour of the former. The tension exerted by the former takes up the slack between all of the helices, and the helices are stretched from a point on the sides of the tire-body at about 9 gradually from their normal condition toward the transverse center of the body—say from six helices to the inch on the sides to five helices to the inch in the transverse center of the tire-body—which produces a varying pitch of the helices and a varying resiliency of the body and the tire from its edges toward the transverse center of the tread of the tire. This leaves a portion of the tire-body on each side of unstretched or normal helices, as shown at 9, to allow free flexure of the sides of the tire from the edges 10, which engage the rim of a wheel, outward in the revolution of the wheel and the tire. After the annulus 6 has been expanded to the desired extent to form the tire-body 7 the sides are drawn down to the flanges 11 on the former, and the longitudinal reinforces 4 are inserted and pushed or forced through all the helices composing the tire-body successively. The former is then contracted, the tire-body removed, and subsequently placed upon a support of the contour of the tire-body and covered with rubber 12 in the manner of making this class or type of tires.

Having thus fully described my invention, what I claim is—

1. A tire-body composed of concentric tubular members and longitudinal reinforces within said members.

2. A tire having a body composed of concentric tubular members, longitudinal reinforces within said members, and a covering of rubber.

3. A tire-body composed of interwoven concentric tubular members and longitudinal reinforces within said members.

4. A tire having a body composed of interwoven concentric tubular members, longitudinal reinforces within said members, and a covering of rubber.

5. A tire-body composed of concentric wire helices and longitudinal reinforces within said helices.

6. A tire having a body composed of concentric wire helices, longitudinal reinforces within said helices, and a covering of rubber.

7. A tire-body composed of interwoven concentric wire helices and longitudinal reinforces within said helices.

8. A tire having a body composed of interwoven concentric wire helices, longitudinal concentric reinforces within said helices, and a covering of rubber.

9. A tire-body composed of interwoven wire helices and longitudinal reinforces and of different degrees of resiliency.

10. A tire having a body composed of interwoven wire helices and longitudinal reinforces interwoven therewith and of different degrees of resiliency, and a covering of rubber.

11. A tire-body composed of interwoven wire helices varying in pitch transversely of the body, and longitudinal reinforces engaging said helices.

12. A tire having a body composed of interwoven wire helices varying in pitch transversely of the body, longitudinal reinforces engaging said helices, and a covering of rubber.

13. A tire having a metallic body of varying degrees of resiliency from its bearing on the rim of a wheel toward the tread of the tire.

In testimony whereof I affix my signature in presence of two witnesses.

THOMAS MIDGLEY.

Witnesses:
C. HERMAN,
KIRK BROWN.